April 14, 1964

P. S. TRAYCOFF ETAL 3,129,041

FOOD SERVICE CART

Filed Dec. 4, 1961

Inventors:
Phillip S. Traycoff,
John T. Heckel, Jr.,
by Hood, Gust & Irish
Attorneys.

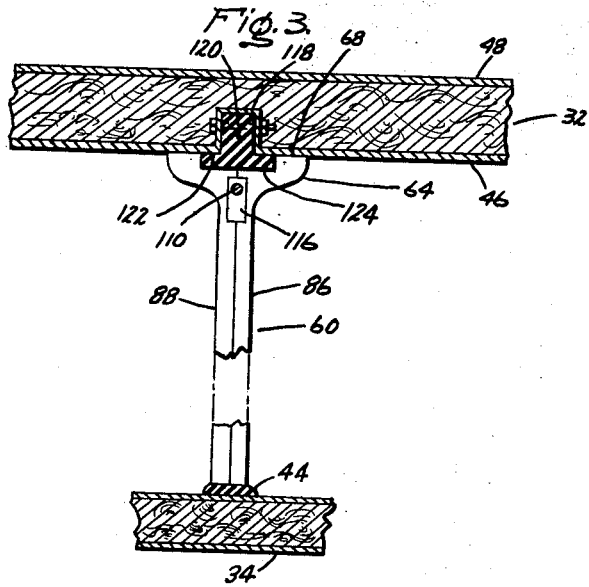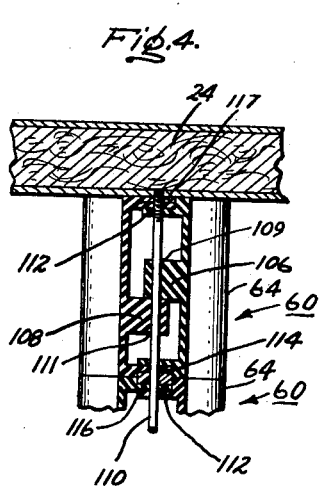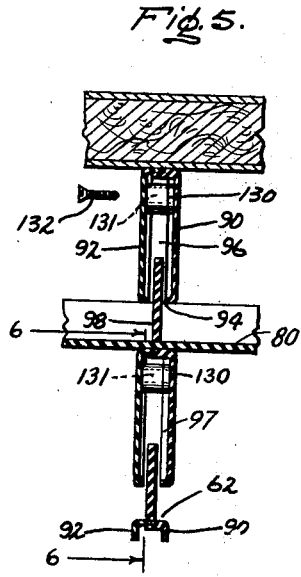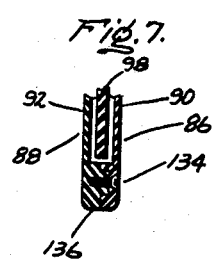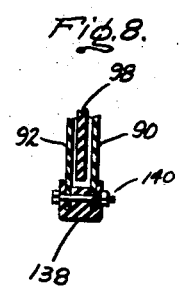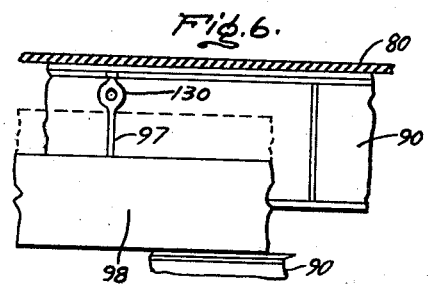

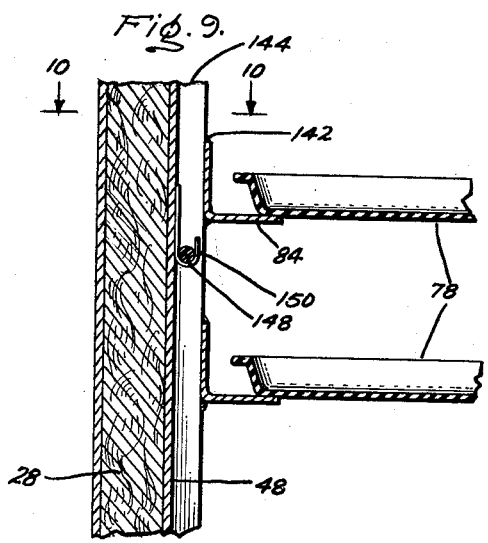
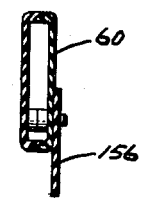
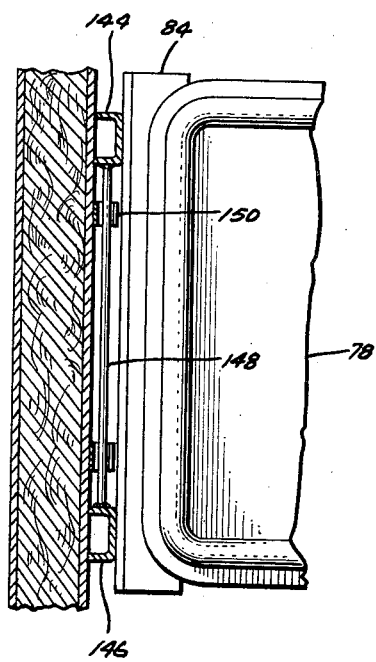
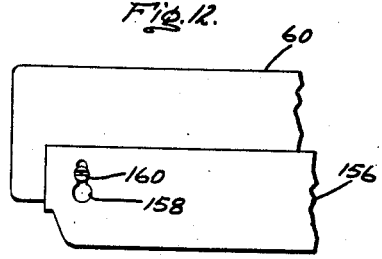

United States Patent Office 3,129,041
Patented Apr. 14, 1964

3,129,041
FOOD SERVICE CART
Phillip S. Traycoff, 231 E. Woodland Ave., Fort Wayne, Ind., and John T. Heckel, Jr., 1126 Prospect St., Indianapolis, Ind.
Filed Dec. 4, 1961, Ser. No. 156,750
15 Claims. (Cl. 312—236)

This invention relates generally to food service carts for transporting individual meal trays, and more particularly to a cart for transporting individual trays of preportioned hot and cold food directly from the food preparation point to the consumer.

In many institutional and commercial establishments, such as hospitals, churches, factories, air lines, prisons, railroads, etc., it is desirable to deliver food to consumers on food serving trays; it is frequently desirable to serve both hot and cold food on the same tray, e.g., meat and vegetables on the one hand and salads and desserts on the other hand. A food service cart has been proposed for transporting a plurality of individual meal trays in one compartment, each of the meal trays having both hot and cold food thereon. In accordance with such proposals, a thermal barrier or partitions was provided for dividing the compartment into two thermally different zones, i.e., hot and cold. The partition comprised at least two vertially spaced-apart sections or webs defining a horizontally extending slot therebetween and each tray was supported in the compartment so as to extend through the partition slot thereby locating one portion of the tray in one of the temperature zones and the other portion in the other zone. To the best of the present applicants' knowledge, such prior food service carts employed compartmented trays, i.e., each tray being separated into two sections by a transverse rib. The partition was aligned with this rib with the edges of adjacent webs respectively engaging the rib of a tray when the tray was positioned in the slot, and with the edges being adapted to engage each other when the tray was removed from the slot thereby thermally to isolate the two different temperature zones.

Such compartmented trays are conventionally molded from laminated plastic material and are more costly than conventional single compartment trays. Further, many institutions have a large supply of standard single compartment trays which are not usable in such prior hot and cold food service carts. It is therefore desirable to provide a hot and cold foot service cart which utilizes standard single compartment trays.

It is accordingly an object of our invention to provide an improved hot and cold food service cart.

Another object of our invention is to provide an improved hot and cold food service cart employing standard single compartment trays.

In accordance with the broader aspects of our invention, we provide a transportable chest having a compartment therein with partition means vertically dividing the compartment into two sections. The partition means have a least two vertically spaced-apart portions defining a horizontally extending slot therebetween. At least one food tray is provided having a single food-receiving section defining the bottom of the tray and surrounded by a rim. Means are provided for removably supporting the tray in the compartment with a transverse portion thereof positioned in the slot and with end portions thereof respectively on either side of the partition means and located in the two compartment sections. Shutter means are provided respectively movably secured to the partition means portions, each of the shutter means extending into and transversely across the section of a tray in the next lower slot and engaging the bottom thereof when the tray is in place, each of the shutter means extending across the next lower slot engaging the next lower partition means portion when no tray is positioned in the respective slot.

Further objects and advantages of our invention will become apparent by reference to the following description and the accompanying drawings, and the features of novelty which characterize our invention will be pointed out with particularity in the claims annexed to and forming a part of this specification.

In the drawings:

FIG. 3 is a fragmentary cross-sectional view taken along the line 3—3 of FIG. 2;

FIG. 4 is a fragmentary cross-sectional view taken along the line 4—4 of FIG. 2;

FIG. 5 is a cross-sectional view taken along the line 5—5 of FIG. 2;

FIG. 6 is a broken away view taken generally along the line 6—6 of FIG. 5;

FIG. 7 is a fragmentary cross-sectional view illustrating a detail of one form of construction of the divider employed in the previous figures;

FIG. 8 is a fragmentary cross-sectional view showing a modified form of divided construction;

FIG. 9 is a fragmentary cross-sectional view showing another detail of the cart of the previous figures;

FIG. 10 is a cross-sectional view taken along the line 10—10 of FIG. 9;

FIG. 11 is a fragmentary cross-sectional view illustrating a modified form of divider usable in our invention; and FIG. 12 is a fragmentary side view of the divider of FIG. 11.

Figure 1:
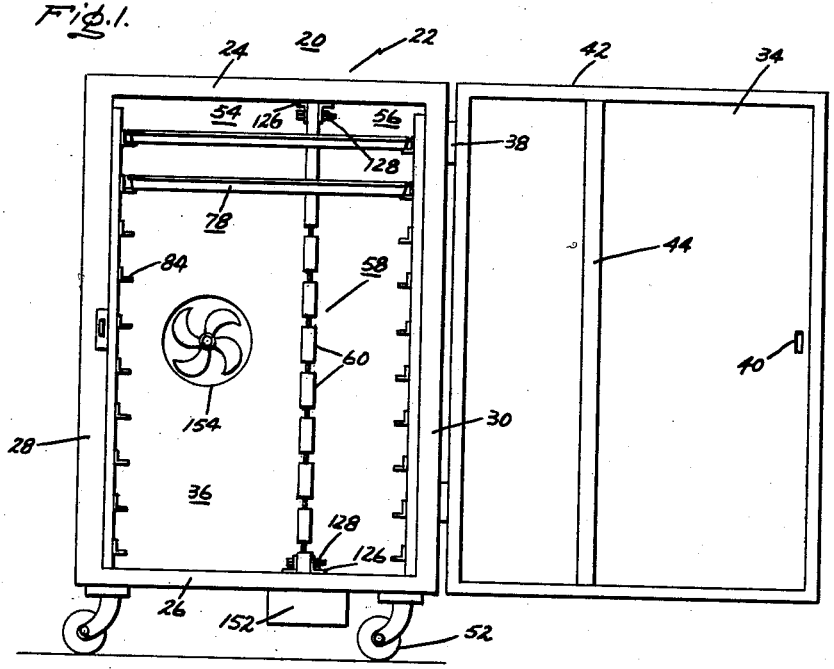
FIG. 1 is a side elevational view of a hot and cold food service cart incorporating our invention.
Figure 2:
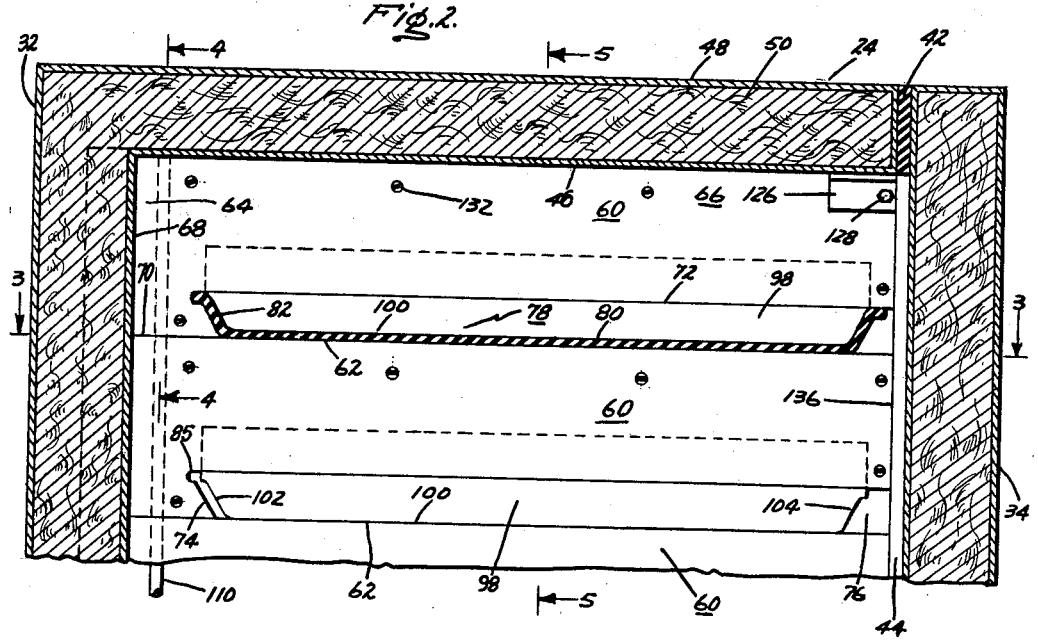
FIG. 2 is a fragmentary cross-sectional view further illustrating the construction of the cart of FIG. 1.

Referring now to FIGS. 1–7 inclusive, there is shown in FIG. 1 a food service cart, generally identified at 20, comprising a chest 22 having top and bottom walls 24 and 26, side walls 28 and 30, back wall 32 and door 34. Door 34 is mounted on the side wall 30 by suitable hinges 38 and is provided with a conventional latch mechanism 40. Door 34 is also provided with a conventional peripheral gasket 42 which sealingly engages the front surfaces of walls 24, 26, 28 and 30 when the door is closed. Door 34 also has a vertically extending gasket 44 attached to its inner surface for a purpose to be hereinafter described. All of the walls of the chest 22 are preferably formed of inner and outer walls 46 and 48 formed of any suitable material possessing the requisite structural strength, such as stainless steel, with the space therebetween being filled with suitable insulation material 50, such as fiberglass. Chest 22 is supported by suitable casters 52 which provide the requisite transportability.

The compartment 36 in the chest 22 is vertically divided into two thermally different zones or sections 54 and 56 by a thermal barrier or partition 58 which extends vertically between top and bottom walls 24 and 26, and transversely between back wall 32 and door 34.

Partition 58 is formed of a plurality of sections 60 now to be described. Each of the partition sections 60 has a straight upper edge 62 and rear and front portions 64 and 66. At this point it will be observed that the upper edge 62 of the uppermost section 60 engages the inner wall 46 of the top wall 24. Each of the rear partition section portions 64 has a rear edge 68 which engages the inner wall of the rear wall 32 and a lower edge 70 which engages the upper edge 62 of the next lower partition section 60. Each of the front portions 66 has a straight lower edge 72 which is joined to the lower edge 70 of the respective rear portions 64 by a shoulder 74, the lower edge 72 and shoulder 74 of one partition section 60 defining with the upper edge 62 of the next lower partition section 60 an elongated, transversely extending slot 76 which extends inwardly from door 34 toward rear wall 32.

A plurality of standard food service trays 78 are provided each having a single food receiving section 80 formed therein which defines the bottom of the tray and which is surrounded by an upstanding rim 82. A plurality of angle brackets 84 are provided at vertically spaced intervals on the inner surfaces of side walls 28 and 30 for removably supporting trays 78 in vertically spaced relation and in alignment respectively with partition slots 76 so that when a tray 78 is positioned in compartment 36, it extends through a respective partition slot 76. Thus it will be observed that one portion of each tray 78 is located in section 54 of compartment 36 and the other is located in section 56. It will be observed by reference to FIG. 2 that the shoulder 74 of the partition section 60 conforms to the outline configuration of the rim 82 of tray 78 and thus it will be further observed that when a tray is positioned in a respective slot 76, the upper edge 62 of the next lower partition section 60 engages the bottom of the tray, that portion of rim 82 which extends through the slot 76 is conformingly seated in the notch 85 formed in shoulder 74, and the lower edge 72 of the front portion 66 of the next higher partition section 60 extends transversely across rim 82 in close proximity thereto but nevertheless with sufficient clearance to permit the tray to be readily slid into the slot when the door 34 is open.

In order thermally to isolate the two sections 54 and 56 of compartment 36 when all of the trays 78 are positioned therein and also when any one or more of the trays are removed, the arrangement now to be described is provided. Each of the partition sections 60 is formed of two mating halves 86 and 88 which may be molded from suitable plastic material, such as a phenolic material. The halves 86 and 88 of the partition section 60 respectively have spaced-apart side walls 90 and 92 which are joined together at the top to define upper edge 62 and which define transversely extending, downwardly facing opening 94 communicating with the respective slot 76. Slidably positioned for vertical movement in the cavity 96 defined between the side walls 90 and 92 of each partition section 60 is a shutter member 98, preferably formed from suitable laminated plastic material.

Each shutter member 98 is vertically movable between a gravity-biased lower or normal position in which its lower edge 100 engages the upper edge 62 of the next lower partition section 60, and an upper position in which it is substantially entirely disposed within the cavity 96 between the side walls 90 and 92 of the respective partition section 60. It will be observed with partiticular reference to FIGS. 1, 2 and 5 that when no tray 78 is positioned in a respective slot 76, the respective shutter member 98 will be in its lower or normal position with its lower edge 100 in engagement with the upper edge 62 of the next lower partition section 60, thus extending substantially across the slot 76 and closing the same thereby thermally isolating the two compartment sections 54 and 56. It will be observed further that when a tray 78 is positioned in a respective slot 76, the respective shutter member 98 extends into and transversely across the tray section 80 with its lower edge 100 in engagement with the bottom thereof. It will further be observed that the ends of each shutter member 98 conform to the outline configuration of the inner surface of rim 82 and bottom 80 of tray 78, as at 102 and 104. Thus, when a tray 78 is in position in a slot 76, shutter member 98 extends transversely thereacross, again thermally isolating the two sections 54 and 56 of chest compartment 36.

It will be seen that when a tray 78 is initially inserted in a respective slot 76, its rim 82 will engage the downwardly tapered end 104 of the respective shutter member 98, thus biasing it upwardly from its lower or normal position to its upper position in the respective cavity 96, thus permitting insertion of the tray. When the tray is completely positioned in the slot 76, the shutter member 98 under the influence of gravity will then drop into the tray section 80 thereby to isolate the two chest sections, as above described.

In order to removably mount the partition 58 in the compartment 36, each of the partition sections 60 has its rear portion 64 enlarged, as best seen in FIGS. 3 and 4. The two halves 86 and 88 of the section have molded therein complementary projections, such as 106 and 108, as seen in FIG. 4, having vertically aligned openings 109, 111 therein for accommodating a vertical tie rod 110 which extends vertically downwardly through the openings in each of the rear portions 64 of partition sections 60 thereby to hold the sections in assembled relation. Each of the rear portions 64 of partition sections 60 has rectangular recesses 112 and 114 respectively formed in its upper and lower sides. In order to provide for alignment of the partition sections 60, rectangular keys 116 are seated in the complementary recesses 112 and 114 of adjacent partition sections 60, as seen in FIGS. 3 and 4. The upper and lower ends of the tie rod 110 are threaded and engage suitable nuts 117 in the recesses 112 and 114 of the uppermost and lowermost partition sections 60.

In order removably to retain and locate the partition 58 with respect to the back wall 32 of the chest 22, a vertically extending slot 118 is formed in the inner wall 46 of the back wall 32 and a T-shaped cross-section gasket 120 formed of suitable gasket material is seated therein with its bar portion 122 projecting from the slot, as seen in FIG. 3. The rear portions 64 of the partition sections 60 respectively have complementary slots 124 formed in their rear edges 68 which receive the bar portion 122 of gasket 120, as best seen in FIG. 3, thus locating the rear side of the partition 58. A similar gasket arrangement (not shown) may be employed in the top wall 24 and bottom wall 26 for engaging the top and bottom edges respectively of the uppermost and lowermost partition sections in order to complete the thermal barrier. The partition 58 is finally removably secured within the compartment 36 by means of suitable angle brackets 126 respectively secured to the inner surfaces of top and bottom walls 24 and 26 and respectively embracing the front ends of the front portions 66 of the uppermost and lowermost partition section 60. Suitable threaded fasteners 128 extend through openings in the angle brackets 126 and the respective partition sections 60 thus to locate the front side of the partition 58. It will be readily seen that the entire partition assembly 58 can be removed for cleaning by merely removing the two threaded fasteners 128 which extend through the upper and lower bracket members 126.

Referring now to FIG. 6 in which a side wall 90 of the half 86 of one of the partition sections 60 is shown, as viewed from the left in FIG. 5, and with its mating half 88 removed to expose the shutter member 98, it will be seen that bosses 130 and depending strengthening ribs 97 are integrally molded on the inner side of the wall 90.

It will be observed that the two halves 86 and 88 of the partition sections 60 are held in assembled relation by means of the complementary molded bosses 130 and 131 on walls 90 and 92, and self-tapping screws 132. Strengthening ribs 99 depend from the bosses 131 on the inner surfaces of walls 92.

Referring briefly to FIG. 7, the two halves 86 and 88 of each partition section 60 may be joined together at the front end of each front portion 66 by suitable self-tapping screws 134 to form front edge 136. With this arrangement, in order to remove and clean the individual shutter members 98, it is necessary to remove the entire partition assembly 58, remove the screws 132 and 134 which hold the two halves of each partition section 60 together, and thus to separate the two halves 86 and 88 of each partition section in order to remove the shutter members 98. Referring briefly to FIG. 8, in the alternative, a cap member 138 may join the front ends of the two side walls 90 and 92 of the two halves 86 and 88 and thus be removably held in assembled relation by means of a suitable threaded fastener 140. With this arrangement, an individual shutter member 98 may be removed from its respective partition section 60, without removing and disassembling the entire partition assembly 58, merely by removing the threaded fastener 140 and in turn the cap member 138 on the front end of the respective partition section 60.

Referring now to FIGS. 9 and 10, the angle brackets 84 which support the trays 78 are removably supported on the side walls 28 and 30 in the manner now to be described. The angle brackets 84 extend transversely across and are secured to, as by welding at 142, a pair of vertically extending channel members 144 and 146. Channel members 144 and 146 respectively have one or more tie bars 148 extending transversely therebetween. Tie bars 148 are in turn removably supported by suitable hooks 150 which are secured to the inner wall 46 of the respective side wall 28, 30 in any suitable manner, as by welding. With this arrangement, the angle brackets 84 and channel members 144, 146 may be removed for cleaning.

It will now be observed that when the door 34 is closed, the vertical gasket 44 on the inner surface thereof engages the front edges 136 of the front portions 66 of the partition section 60.

If desired, suitable refrigeration apparatus, shown schematically at 152 in FIG. 1, may be provided for chilling the section 56 of compartment 36, and a suitable blower 154 may be provided in the rear wall 32 for circulating warm air through the other compartment section 54.

Since the trays 78 have no rib extending transversely thereacross, it will be readily seen that for any given installation, the cart may be constructed with the partition 58 at any desired location, thus providing any relative proportioning desired between the hot and cold portions of the trays. It will further be readily apparent that, if desired, the location of the partition 58 may be made adjustable.

Referring now to FIGS. 11 and 12, shutter members 156 may be slidably mounted on the outer side of partition section 60. With this arrangement, suitable slots 158 may be provided in the shutter members 156 slidably and removably engaging suitable studs 160 on the respective partition section 60 to permit the requisite vertically sliding movement of the shutter members 156 and also their ready removal for cleaning. It will be readily seen that the shutter members 156 are proportioned exactly the same as the shutter members 98 of the embodiment of the previous figures and that their operation is the same.

It will now be seen that we have provided an improved hot and cold food service cart wherein standard single compartment trays may be employed, such trays thus being used interchangeably in our improved hot and cold food service cart and other types of storage and transfer carts, in cafeteria lines, etc.

While we have illustrated and described specific embodiments of our invention, further modifications and improvements will appear to those skilled in the art and we desire therefore in the appended claims to cover all modifications which do not depart from the spirit and scope of our invention.

What is claimed is:

1. In a food service cart for transporting a plurality of individual meal trays in one compartment, each tray having a single food-receiving section defining the bottom wall of said tray and surrounded by a rim; the improvement comprising thermal barrier means for dividing said compartment into two thermally different zones, said thermal barrier means comprising a first web having a lower edge extending across the rim of a lower tray when said lower tray is in place, a second web having an upper edge spaced from said lower edge of said first web, said upper edge of said second web extending across the bottom surface of said bottom wall of said tray and engaging the same when said tray is in place, and shutter means movably attached to said first web and having a lower edge, said shutter means being adapted to extend into and across said tray section with its lower edge engaging the top surface of said bottom wall thereof when said lower tray is in place, said lower edge of said shutter means being adapted to engage said upper edge of said second web when no tray is positioned in the space between said webs.

2. The combination of claim 1 wherein said first web is hollow and said shutter means is slidably mounted therein.

3. The combination of claim 1 wherein said lower edge of said shutter means conforms to the inner surface of said bottom wall of said tray section and said rim.

4. Apparatus for storing and delivering at least one tray of preportioned hot and cold food from its point of preparation directly to the consumer comprising: transportable chest means having a compartment therein; partition means vertically dividing said compartment into two sections, said partition means having at least two vertically spaced-apart portions defining a slot therebetween; at least one food tray having a single food-receiving section defining the bottom wall of said tray and surrounded by a rim; means for removably supporting said tray in said compartment with a portion of the tray positioned in said slot and with each end portion of the tray respectively on either side of said partition means and in either of said two compartment sections; and shutter means respectively movably secured to said partition means portions, each of said shutter means extending into and across said section of a lower tray and engaging the top surface of said bottom wall thereof when said lower tray is in place, each of said shutter means extending along the next lower slot and engaging the next lower partition means portion when no tray is positioned in the respective slot.

5. The combination of claim 4 wherein each of said partition means portions respectively comprises two side walls defining a space therebetween, wherein each of said shutter means is slidably mounted in said space of the respective partition means portion for vertical movement, and wherein each of said shutter means has its bottom edge conforming to the inner surface of said bottom wall of the respective tray section and the rim thereof.

6. Apparatus for storing and delivering trays of preportioned hot and cold food from its point of preparation directly to the cnosumer comprising: a transportable chest having top, bottom, side and back walls defining a generally rectangular compartment; a door closing said compartment and providing access thereto; partition means extending vertically between said top and bottom walls and transversely between said back wall and door thereby dividing said compartment into two thermally different sections, said partition means comprising a plurality of transversely extending elements each having upper and lower edges, said upper and lower edges of adjacent elements being vertically spaced-apart respectively to define a plurality of transversely extending tray-receiving slots; a plurality of generally rectangular food trays each having a single food-receiving section defining the bottom wall of the tray and surrounded by a rim, means respectively on said side walls for removably supporting said trays in said compartment in vertically spaced-apart relation with each tray extending through a respective slot and with the upper edge of the next lower partition means element engaging the bottom surface of the bottom wall of the tray whereby portions of each tray are respectively located in said two compartments sections; and transversely extending shutter members respectively slidably mounted on said partition means elements for vertical movement between a lower normal position and an upper position, each of said shutter members having a lower edge and in its lower position extending along the next lower slot with said lower edge thereof engaging the upper edge of the next lower partition means element thereby respectively closing said slots when said trays are removed from said compartment, each of said shutter members being biased to its upper position responsive to initial insertion of a tray in the respective slot, each of said shutter members extending into and transversely across said section of a tray when the tray is positioned entirely in said compartment and extends through the respective slot with the bottom edge of said shutter member engaging the top surface of said bottom wall and the rim of the tray thereby respectively closing said slots when said trays are positioned in said compartment.

7. The combination of claim 6 wherein each of said shutter members is slidably mounted on the side of the respective partition means element.

8. The combination of claim 6 wherein said partition means elements respectively comprise side walls defining spaces therebetween, and wherein each of said shutter members is slidably mounted in said space of the respective partition means element, each of said shutter members in its upper position being substantially within said space of the respective partition means element.

9. The combination of claim 8 further comprising an end cap member removably secured to the ends of said side walls of each of said partition means elements remote from said chest back wall thereby closing the end opening defined between said side walls, each of said shutter members being removable through the respective end opening when the respective end cap member is removed.

10. Apparatus for storing and delivering trays of preportioned hot and cold food from its point of preparation directly to the consumer comprising: a transportable chest having top, bottom, side and back walls defining a generally rectangular compartment; a door closing said compartment and providing access thereto; partition means extending vertically between said top and bottom walls and transversely between said back wall and door thereby dividing said compartment into two thermally different sections, said partition means comprising a plurality of transversely extending elements each having upper and lower edges, said upper and lower edges of adjacent elements being vertically spaced-apart respectively to define a plurality of transversely extending tray-receiving slots; a plurality of generally rectangular food trays each having a single food-receiving section defining the bottom wall of the tray and surrounded by a rim; means respectively on said side walls for removably supporting said trays in said compartment in vertically spaced-apart relation with each tray extending through a respective slot and with the upper edge of the next lower partition means element engaging the bottom surface of the bottom wall of the tray whereby portions of each tray are respectively located in said two compartment sections; and transversely extending shutter members respectively slidably mounted on said partition means elements for vertical movement between a lower normal position and an upper position, each of said shutter members having a lower edge and in its lower position extending along the next lower slot with said lower edge thereof engaging the upper edge of the next lower partition means element thereby respectively closing said slots when said trays are removed from said compartment, each of said shutter members being biased to its upper position responsive to initial insertion of a tray in the respective slot, each of said shutter members extending into and transversely across said section of a tray when the tray is positioned entirely in said compartment and extends through the respective slot with the bottom edge of said shutter member engaging the top surface of said bottom wall and the rim of the tray thereby respectively closing said slots when said trays are positioned in said compartment; each of said partition means elements having a rear portion which engages said back wall of said chest, each said rear portion having a bottom edge which engages the top edge of the next lower partition means element, each of said partition means elements having a front portion which defines said lower edge thereof, each of said rear portions having a front edge which conforms to said tray rim and defines the rear side of the respective slot for receiving the rim of a tray when positioned therein.

11. The combination of claim 10 further comprising means extending vertically through said rear portions for removably holding said partition means elements in assembled relation.

12. The combination of claim 10 wherein said back wall has a vertically extending slot formed therein, and further comprising a gasket member seated in said back wall slot and having a portion projecting therefrom, said rear portions of said partition means elements respectively having a vertically extending slot formed therein with said projecting portion of said gasket member being seated therein.

13. The combination of claim 10 wherein each of said rear portions has an opening extending vertically therethrough, and further comprising fastener means extending through said openings for removably holding said partition means elements in assembled relation, means cooperating with adjacent rear portions for holding said partition means elements in vertical alignment, means on said rear wall removably engaging said rear portions for locating the same, and means removably securing the front portion of the uppermost and lowermost partition means elements to said top and bottom chest walls respectively.

14. Apparatus for storing and delivering trays of preportioned hot and cold food from its point of preparation directly to the consumer comprising: a transportable chest having top, bottom, side and back walls defining a generally rectangular compartment; a door closing said compartment and providing access thereto; partition means extending vertically between said top and bottom walls and transversely between said back wall and door thereby dividing said compartment into two thermally different sections, said partition means comprising a plurality of transversely extending elements, each of said elements having a straight horizontally disposed upper edge, each of said elements having a rear portion and a front portion, each of said rear portions having a rear edge and a lower edge which engages the upper edge of the next lower element, each of said front portions having a lower edge joined to the lower edge of the respective rear portion by a shoulder, the lower edge of each front portion being vertically spaced-apart from the upper edge of the next lower element to define therewith and with said shoulder a transversely extending tray-receiving slot which is open at its end remote from said shoulder; means for removably securing said rear portions of said partition means elements in assembled relation; means for removably securing said rear edges of said rear portions in engagement with said back wall of said chest; each of said front portions of said partition means elements having spaced-apart side walls defining a cavity which is open on the side thereof facing the upper edge of the next lower element; an elongated shutter member slidably mounted in each of said cavities for vertical movement between a lower normal position and an upper position substantially within said cavity, each of said shutter members having a lower edge and in its lower position extending along the respective slot and with its lower edge engaging the upper edge of the next lower element thereby respectively substantially closing said slots thermally to isolate said compartment sections when trays are not positioned therein.

15. The combination of claim 14 further comprising a plurality of generally rectangular food trays each having a single food-receiving section defining the bottom wall of the tray and surrounded by a rim; and means for removably supporting said trays in said compartment in vertically spaced-apart relation with each tray extending through a respective slot and with the upper edge of the next lower partition means element engaging the bottom surface of the bottom wall of the tray whereby portions of each tray are respectively located in said two compartment sections; said shoulders of said partition means elements respectively conforming to and receiving the rims of said trays when the same are in said compartment; said shutter members respectively having said lower edges conforming to the top surfaces of the bottom walls and rims of said tray sections; said shutter members respectively extending into and transversely across said tray sections with their lower edges respectively engaging the top surfaces of the bottom walls and rims of the tray when said trays are in said compartment thereby closing said slots, said shutter members being respectively moved from their normal positions to their upper positions responsive to initial insertion of each tray in its respective slot.

References Cited in the file of this patent

UNITED STATES PATENTS

| | | |
|---|---|---|
| 1,669,057 | Katzinger | May 8, 1928 |
| 1,907,414 | Antrim | May 2, 1933 |
| 2,327,246 | Bunjes | Aug. 17, 1943 |
| 2,386,368 | Taylor | Oct. 9, 1945 |
| 2,636,797 | Alheit | Apr. 28, 1953 |
| 2,805,453 | Petronello | Sept. 10, 1957 |
| 2,845,780 | Conklin | Aug. 5, 1958 |
| 3,042,384 | Bauman | July 3, 1962 |